(Model.)
2 Sheets—Sheet 1.
N. P. NELSON.
MACHINE FOR ROLLING BLANKS FOR TOOLS.
No. 262,688.
Patented Aug. 15, 1882.
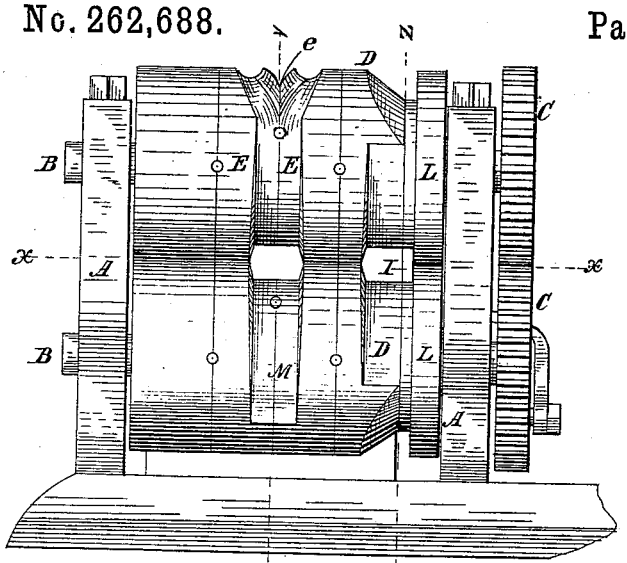
Fig 1
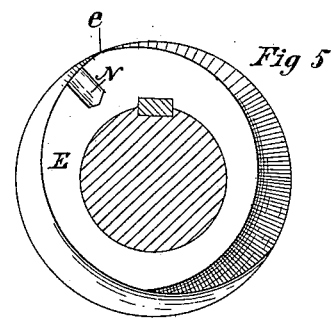
Fig 4
Fig 5
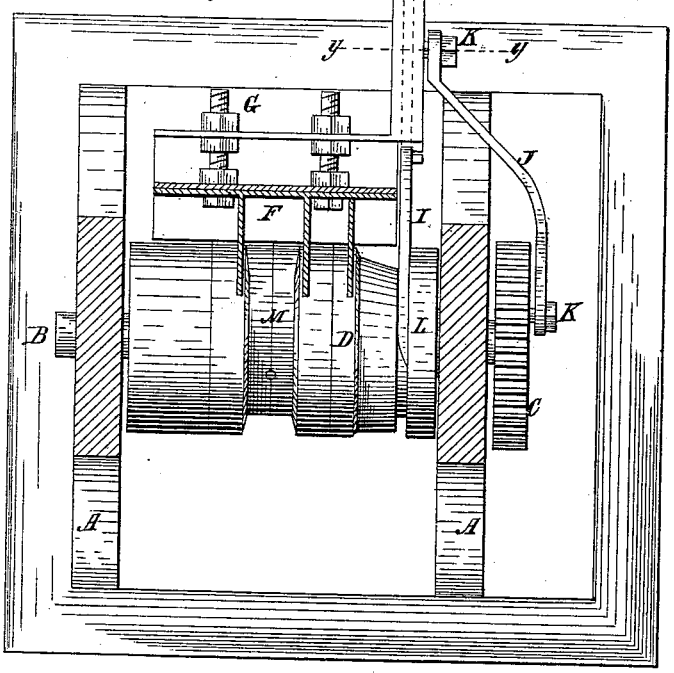
Fig 2
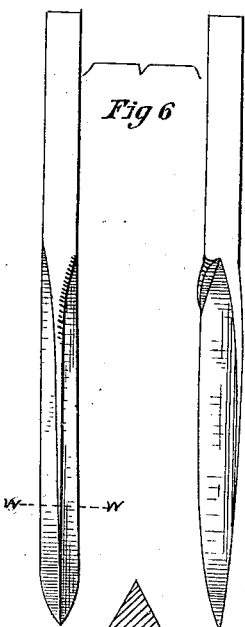
Fig 6
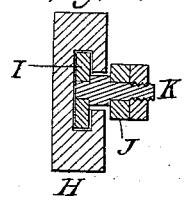
Fig. 3.
Fig 7
Witnesses
W. C. Corlies
Jno. C. MacGregor
Inventor
Nels P. Nelson
By
Attorneys (Model.) 2 Sheets—Sheet 2.

N. P. NELSON.
MACHINE FOR ROLLING BLANKS FOR TOOLS.

No. 262,688. Patented Aug. 15, 1882.

Witnesses
W. C. Coulies
Jno. C. MacGregor

Inventor
Nels P. Nelson
By Coburn & Thacher
Attorneys

N. PETERS. Photo-Lithographer, Washington, D. C.

UNITED STATES PATENT OFFICE.

NELS P. NELSON, OF CHICAGO, ILLINOIS, ASSIGNOR OF ONE-HALF TO SETH PIPER, OF SAME PLACE.

MACHINE FOR ROLLING BLANKS FOR TOOLS.

SPECIFICATION forming part of Letters Patent No. 262,688, dated August 15, 1882.

Application filed April 11, 1881. (Model.)

*To all whom it may concern:*

Figure 8:
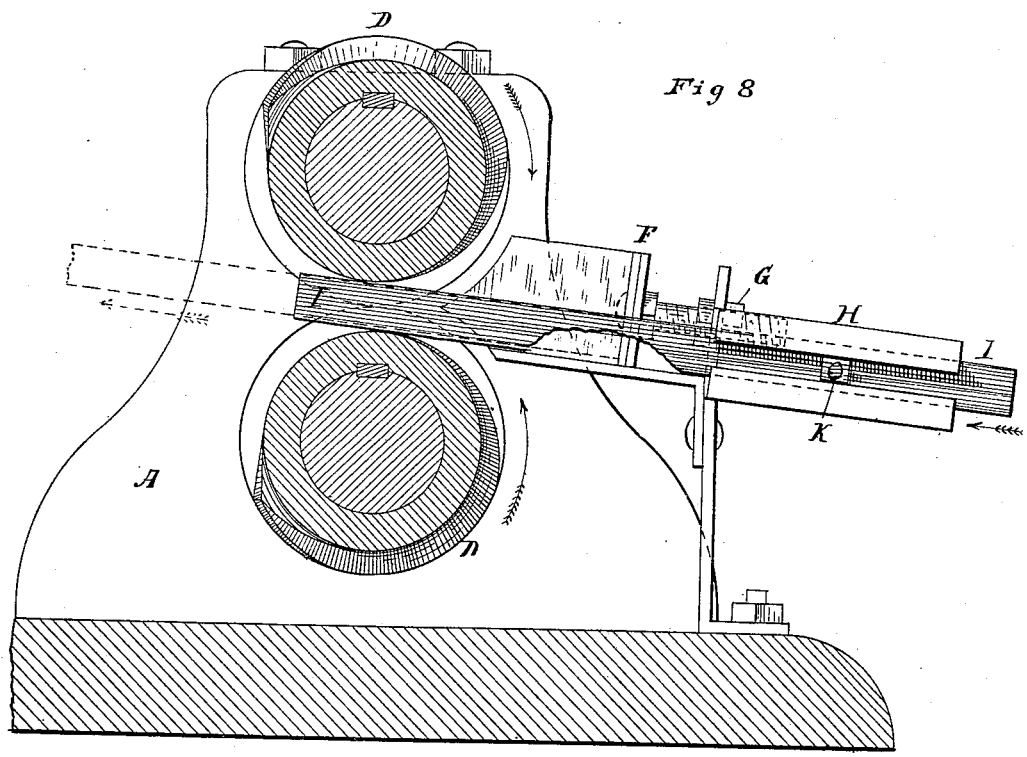
Figure 9:
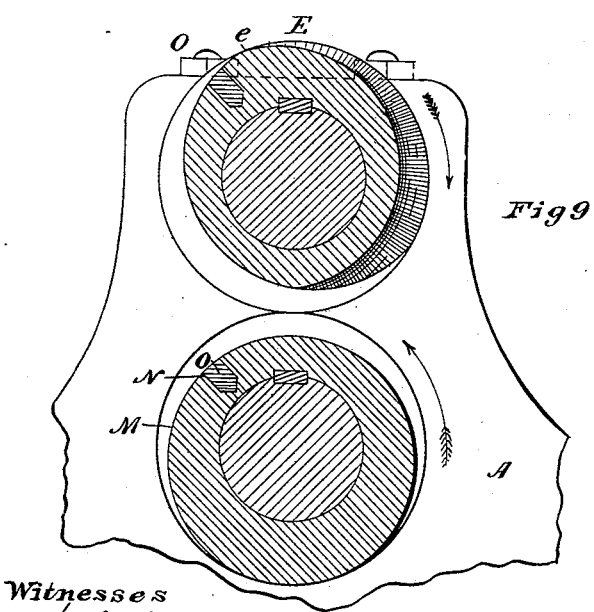
Figure 10:
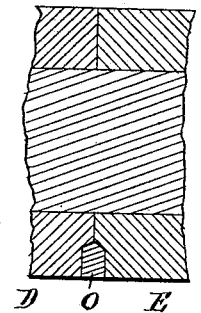

Be it known that I, NELS P. NELSON, a citizen of the United States, residing at Chicago, in the county of Cook and State of Illinois, have invented certain new and useful Improvements in Rolling-Mills, which are fully set forth in the following specification, reference being had to the accompanying drawings, in which—
Figure 1 represents the front side of my improved rolling-mill; Fig. 2, a top or plan view of the same; Fig. 3 a sectional view taken at *y y*, Fig 2; Fig. 4, a side view of one of the dies D, taken at the line *z z;* Fig. 5, side view of one of the dies E where they come together at the line *v v;* Fig. 6, a face and side view of one of the ice-tools rolled by my mill; Fig. 7, a sectional view of the same, taken at the line *w w*, Fig. 6. Fig. 8 is an enlarged section of the machine on the line *z z* in Fig. 1. Fig. 9 is a similar section on the line *v v* in Fig. 1. Fig. 10 is a detailed section, showing the mode of fastening the two dies together.

It has heretofore been necessary to forge up ice-tools in the shape shown in Figs. 6 and 7, and an attempt has been made to do this work under a trip-hammer; but inasmuch as it is necessary to have sharp cutting-edges at the angles, as well as a sharp point to cut the ice, it has been very difficult to accomplish this in any way except by hand-forging.

The object of my invention is to make a rolling-mill by which I am enabled to roll the triangular part of these ice-tools in the form shown; and my invention consists in making dies of a shape hereinafter fully described, and also in an adjustable stop, by which the length of the rolled part of the tool is regulated, and also in the combination of the dies with the movable piece, which moves with the tool as it is being rolled, as hereinafter fully described.

In the accompanying drawings, A represents a frame of any suitable construction for holding the operating parts of the mechanism.
B denotes a pair of roller-shafts arranged vertically one above the other, and having suitable bearings in the frame A. Each shaft carries at one end a cog-wheel, C, the teeth of the wheels engaging with each other, so that motion being imparted to one shaft will be by it communicated to the other. On the two shafts, near one end, are formed on the rollers or attached to them a pair of dies, D, arranged to come directly opposite each other in the course of a revolution, and which are of a length equal to that requisite for the triangular portion of the tool to be rolled. Each die is in shape a segment of the frustum of a cone, the bases of the frusta being tangent when the dies are opposite each other and in the same plane, as shown in Fig. 1 of the drawings. The two dies thus converge on one edge. The space between their divergent edges is closed by a sliding plate, I, which moves back and forth between the rollers and rests laterally against circular flanges L formed on the two shafts. Back of the rollers it is supported in the grooved guide H, which is affixed to the frame. A connecting-rod, J, pivoted on the pins K at one end to the periphery of one of the cog-wheels C, and at the other end to the sliding plate I, communicates to the latter a reciprocating motion from the revolution of the rollers. The rollers being brought into that position in which the dies are farthest from each other, the bar of which the tool is to be formed is then inserted between the rollers, which, on that part of their circumference not occupied by the dies, are grooved to a breadth equal to that of the dies, and continuously with the deepest part of them. The bar being thrust back a distance equal to the requisite length of its triangular portion, the rollers are set in motion, and the two dies D coming opposite each other shape the bar as it is pushed forward between the rollers into a triangular prism, the two converging sides being formed by the dies, and the base resting against the sliding plate I. The distance to which the bar is pushed back when inserted in the rollers is regulated in correspondence with the length of the dies by the upright portion of a stop, F, which is arranged back of the rollers, and which has also a horizontal portion to support the end of the bar, as well as walls extending toward the rollers to keep the bar from veering laterally. The distance of this stop back of the rollers may be adjusted by means of the bolts and nuts G, which secure it to an upright plate permanently affixed behind it to the base of the frame A. This part of the machine is best shown in Figs. 2 and 8 of the drawings.

On the upper shaft, B, to the right or left of the die D, is formed on the roller or attached thereto, a die, E, grooved, as shown in Fig. 2, to receive the triangular portion of the bar, so that the edge formed by the two dies D shall rest against the deepest part of the die E. On the lower roller, and on that part of its periphery which is farthest from the die, a flat-bottomed groove or bed-plate, M, is formed of a suitable breadth to receive the base side of the triangular bar. The upper roller is also similarly grooved on that part of its periphery which is not occupied by the die E. The sides of the die E converge to a point at one end, e, which is arranged to come opposite the thickest part of the lower roller in the course of the revolution. The rollers having been brought into that position in which the grooves are opposite each other, and the stop-plate F being adjusted at a distance corresponding to that between the deepest point of the upper roller and the pointed end of the die E, the triangular bar previously formed by the dies D is inserted between the rollers and pushed through till its end rests against the stop F. The rollers being then set in motion carry the bar out again away from the stop, the die E, in the meantime embracing it, forming its inner end to a point, and cutting it off at the point by reason of the groove or bed-plate M on the lower roller terminating at or near a point opposite to the open end of the die E on the upper roller, so that for the whole length of the die the bar is closely held between it and the full periphery of the lower roller, and where (as at its pointed end) the die comes into immediate contact with this periphery, the bar is necessarily cut off.

It is obvious that the dies on each shaft may be made in one piece with the respective shafts; but I prefer to make the dies separate from the shafts in order to remove them therefrom for repairing when worn.

The recesses N made in the dies receive a pin, O, to keep the dies together, the pin being received about one-half in each die, in the manner shown in Fig. 10. The dies may be fastened to the shafts in any ordinary manner, so as to move with them.

By means of this mechanism I am enabled to manufacture the ice-tools shown from steel, with sharp cutting-edges, inexpensively, uniformly, and rapidly. I am also enabled to roll them in a straight form, in the shape shown in Fig. 6.

Having thus described my invention, what I claim as new, and desire to secure by Letters Patent, is—

1. In a rolling-mill, upper and lower dies converging toward one side, in combination with a sliding plate arranged at their divergent edges, substantially as and for the purpose described.

2. In a rolling-mill, the combination of the upper and lower dies, D, each having a single laterally-inclined face, the two being arranged convergently for the purpose of rolling a triangular cutting-tool, substantially as described.

3. The corresponding laterally-inclined dies D, in combination with the dies E, shaped as described and provided with severing-edges, substantially as and for the purpose described.

4. The combination, in a rolling-mill, of the dies, the reciprocating sliding plate I, and connecting-rod J, for the purpose of moving the reciprocating sliding plate in connection with the dies, substantially as specified and shown.

NELS P. NELSON.

Witnesses:
ALICE HALLISTER,
MINNIE B. GAGE.